H. J. SHERRILL.
RESILIENT TIRE.
APPLICATION FILED AUG. 19, 1912.
1,097,682.
Patented May 26, 1914.
2 SHEETS—SHEET 1.
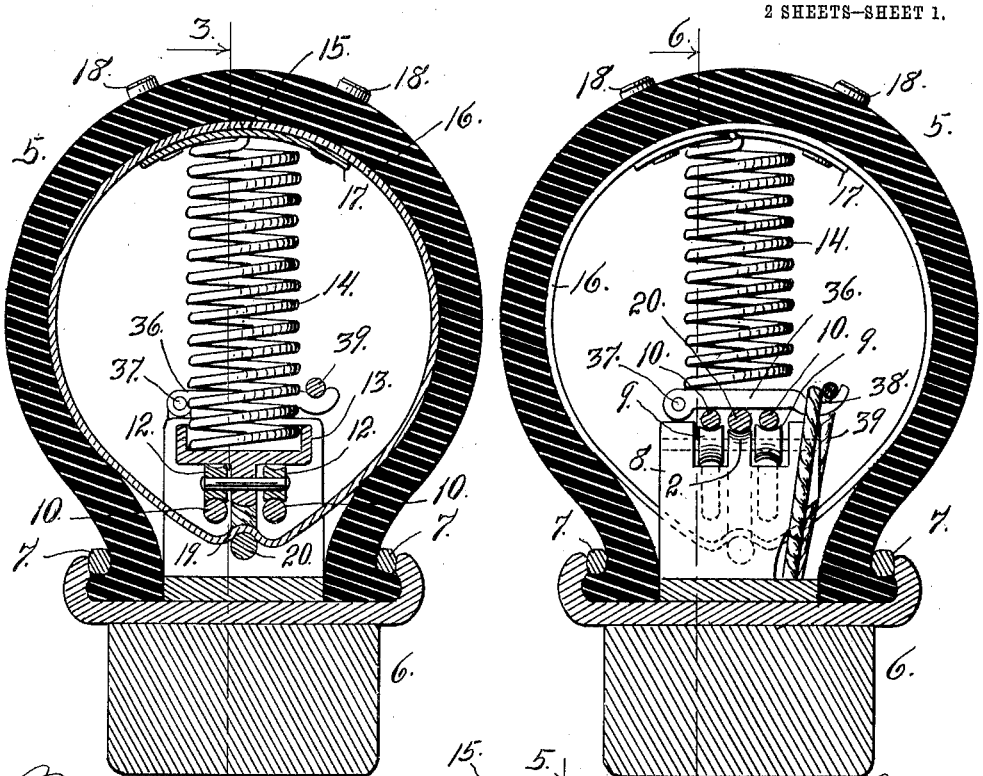
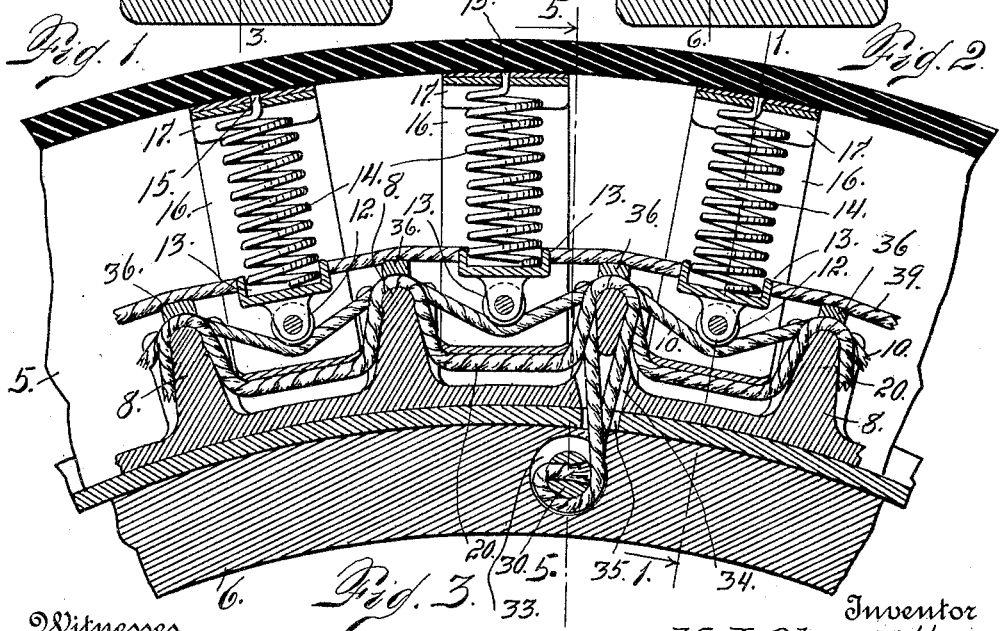
Witnesses
Otto E. Hoddick
C. H. Roesner
Inventor
H. J. Sherrill
By A. J. O'Brien
Attorney
COLUMBIA PLANOGRAPH CO., WASHINGTON, D. C.

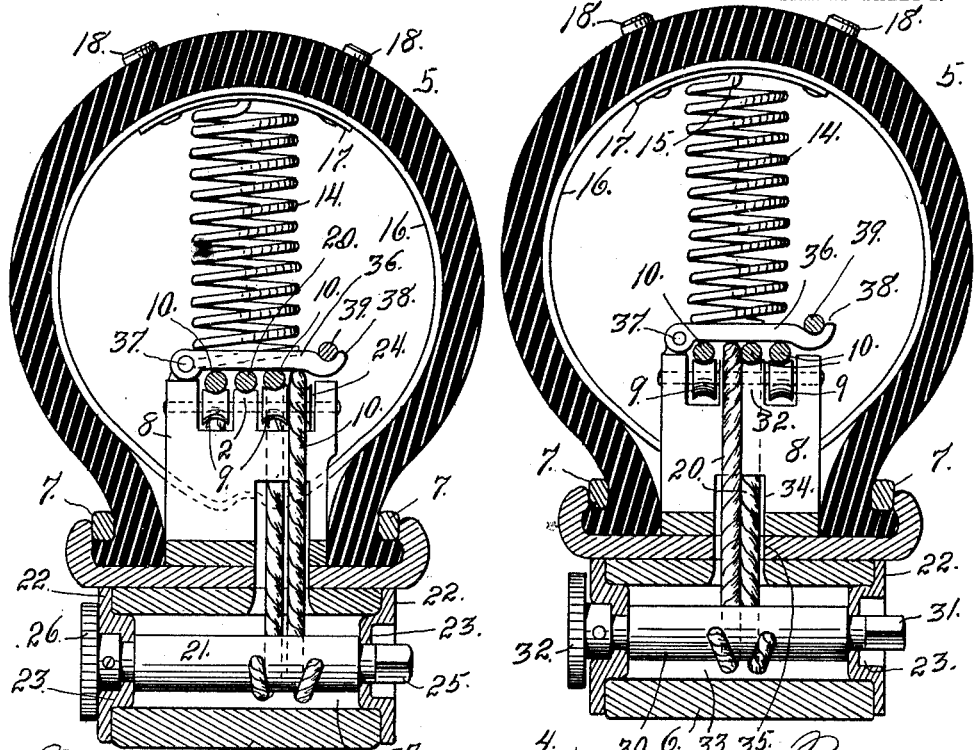
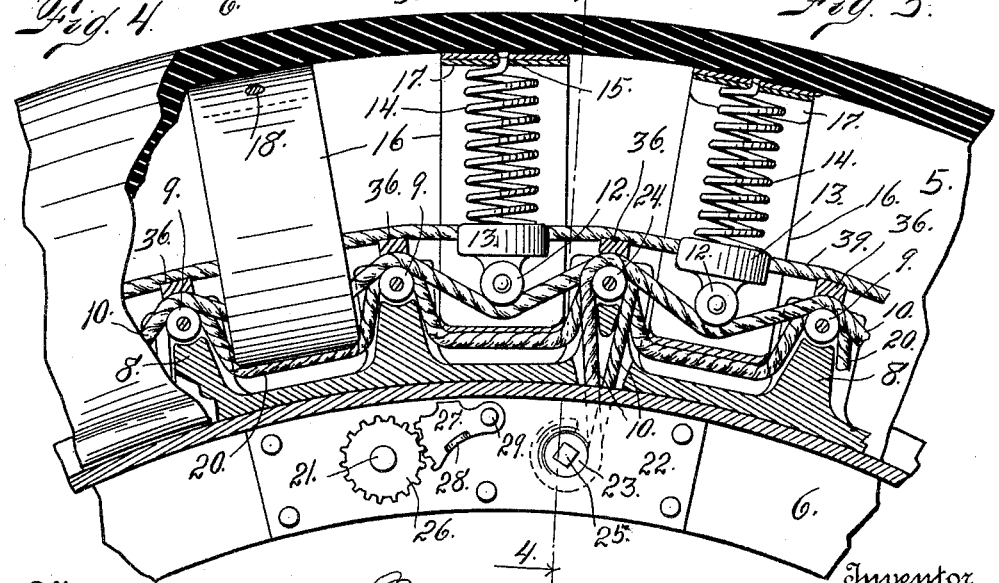

UNITED STATES PATENT OFFICE.

HARRY J. SHERRILL, OF SALIDA, COLORADO.

RESILIENT TIRE.

1,097,682.  Specification of Letters Patent.  Patented May 26, 1914.

Application filed August 19, 1912. Serial No. 715,714.

*To all whom it may concern:*

Be it known that I, HARRY J. SHERRILL, citizen of the United States, residing at Salida, county of Chaffee, and State of Colorado, have invented certain new and useful Improvements in Resilient Tires; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in resilient tires, my object being to provide a tire for use upon automobiles and other vehicles which, by reason of springs interposed within a hood, or casing, shall give the desired degree of resilience, thus obviating the necessity of employing pneumatic tires, and avoiding the difficulty incident to the puncturing of these tires.

In my improved construction I employ a number of leaf springs arranged transversely in the hood and suitably spaced, and a cable located within the tire and engaging the said leaf springs for tensioning the latter. Arranged within and surrounded by each one of these leaf spring members is a spiral spring member, the outer extremity of the spiral spring being connected with the leaf spring member while its inner extremity engages a suspended seat carrying anti-frictional pulleys which are engaged by tensioning cables. The spring members, both leaf and spiral, are interposed between bosses or projections carried by the rim, or felly, of the wheel. These bosses are equipped with pulleys over which the different cables press. The pulleys carried by the spiral spring seats normally extend inwardly beyond the tops, or outer extremities, of the interposed bosses, whereby the cables, when in place, occupy a zig-zag position circumferentially of the tire and within the same. The cable which tensions the leaf springs also takes a zig-zag course, passing over pulleys mounted on the bosses and bending inwardly between the bosses to engage the leaf springs.

Having briefly outlined my improved construction, I will proceed to describe the same in detail, reference being made to the accompanying drawing, in which is illustrated an embodiment thereof.

In this drawing: Figure 1 is a cross section of a tire equipped with my improvements. This is a section taken on the line 1—1, Fig. 3. Fig. 2 is a similar section taken on a line showing the terminals of the brake cable. Fig. 3 is a fragmentary longitudinal section of the tire, taken on the line 3—3, Fig. 1. Fig. 4 is a cross section of the tire taken on the line 4—4, Fig. 6. Fig. 5 is a similar section taken on the line 5—5, Fig. 3. Fig. 6 is a section taken on the line 6—6, Fig. 2.

The same reference characters indicate the same parts in all the views.

Let the numeral 5 designate the hood, or casing, of the tire which is connected with the felly, or rim 6 of the wheel in any suitable manner. As shown in the drawing, the hood is secured to the felly by means of fastening members 7 of any suitable, desired, or ordinary character now in use.

The felly 6 of the wheel is provided with a number of bosses 8 which extend outwardly beyond the felly and enter the cavity of the tire, the said bosses being suitably spaced. Upon each of these bosses 8 are mounted two anti-frictional pulleys 9, one on each side adapted to be engaged by cables 10 which also engage pulleys 12 carried by cup-shaped seats 13 which are engaged by the inner extremities of spiral spring members 14 whose axes are radially arranged with reference to the center of the wheel. It will be understood that each of these seats 13 carries two pulleys 12,—see Fig. 1. The outer extremity of each spiral spring is anchored, as shown at 15, in a leaf spring 16 arranged transversely in the tire and engaging the inner surface of the wall thereof. The axis of this spring may be said to coincide with the central circumference of the tire. The outer portion of each spring 16 is reinforced by a plate 17 shaped to correspond with the curve of the leaf spring, the reinforcing plates 17 being secured to the tread portions of the leaf springs 16 by means of rivets 18 which pass through the reinforcing plates, the spring members and the hood of the tire. At the inner circumference of each leaf spring 16 there is arranged an indentation, or recess 19, adapted to be engaged by a tension cable 20 which engages each leaf spring 16, the said cable passing over projections 2 carried by the bosses 8 and interposed between the pulleys 9 of each boss.

Each cable 10 has its extremities connected with a spool 21 journaled in the felly of the wheel, which is reinforced on opposite sides by plates 22, the said plates being inset, as shown at 23 and the spools being journaled in these inset portions of the plates. The boss 8, where the two terminals of each cable pass inwardly to the spool 21, is equipped with an additional anti-frictional pulley 24, since the cable extremities where they come together and pass out of the tire must lie side by side. In view of the fact that an additional pulley is required where the terminals of each cable 10 pass out of the tire to a spool, it is preferred to have a separate tension spool for each cable 10, whereby the terminals of the two cables may leave the tire at different bosses. This feature is illustrated in Fig. 6 of the drawing. One extremity of each spool 21 is formed polygonal, preferably square in cross section, as shown at 25, to receive a socket key or wrench for tightening the cable. The opposite extremity of each spool 21 is provided with a ratchet disk 26 adapted to be engaged by a locking dog 27 provided with an upturned lip 28 for convenience of adjustment. The dog is pivoted on a plate 22, as shown at 29. Assuming that the two spools 21 for the two cables 10 are arranged in close proximity to each other, as indicated in Fig. 6, it is preferred that the socket key ends 25 and the ratchet disk 26 be reversely arranged in order to give more room for manipulating the locking dogs.

The central cable 20 employed for tensioning the leaf springs 16, is also connected with a tension spool 30 having a head 31 and a ratchet disk 32 adapted to be locked in any suitable manner, as by the employment of a dog 27, as shown in connection with the tension spools 21. The boss 8, located where the terminals of the cable 20 leave the tire for connection with the spool 30, is provided with a bearing 3 somewhat wider than the bearing 2 employed in connection with the other bosses.

From the foregoing description, the use and operation of my improved resilient tire will be readily understood.

The felly is transversely bored to form cavities 33 where each spool is located, but the plates 22 located on opposite sides of the felly where these cavities are formed, constitute reinforcing members and compensate for the weakening of the felly which would otherwise result. It will be understood that the bosses where the cable terminals leave the tire for connection with the spools, are recessed, as shown at 34, the periphery of the felly being provided with an opening 35 for the same purpose.

The manner of tensioning the springs 14 and 16 will be readily understood. As the spools 21, for instance, are rotated, the cables 10 will be shortened, since they occupy a circumferential zig-zag position, the tightening or winding of the cables upon the spools having a tendency to straighten the portions of the cables within the tire, thus forcing the seats 13 outwardly and compressing the spiral springs 14. Again, when it is desired to increase the tension of the leaf spring 16, the cable 20 is manipulated in the same manner, and with the same result.

It will be understood that the cables 10 not only serve to regulate the tension of the springs 14 through the instrumentality of the tension spools 21, but they also serve to automatically equalize the tension of the various springs 14 while the wheel is in use, since the pressure upon the tread of the tire whereby any spring 14 is compressed, acts upon both cables 10, and as these cables engage anti-frictional devices, pressure thereon at any one point necessarily influences the cable throughout the entire length thereof. This is also true with reference to the cable 20 and the leaf springs 16, which are tensioned by the last cable. However, if desired, all of the cables, after adjustment, may be locked against movement by means of levers 36 which are pivoted to the bosses 8 as shown at 37 and are adapted to clamp the cables against the parts upon which the cables bear in passing over the bosses. It is preferred to apply one of these levers to each boss. Each lever is recessed as shown at 38 at its free extremity to receive a tightening or brake cable 39 which acts upon all the levers to throw the latter to the cable-locking position. The terminals of the cable 39 are carried out of the tire and connected with a tension spool which is manipulated in the same manner as the other tension spools heretofore explained. It will be understood that when the tread of the tire is compressed, there will be a tendency to flatten the leaf springs 16 whereby they are caused to constantly hug the inner surface of the hood, thus preventing the hood from any tendency toward lateral movement.

Having thus described my invention, what I claim is:

1. A resilient tire comprising leaf springs arranged transversely in the hood and engaging the inner surface of the walls of the hood, the said springs being suitably spaced, a cable engaging the inner portions of the said springs for tensioning the latter, bosses interposed between the said springs and extending outwardly beyond the portions of the springs engaged by the cable, causing the latter to occupy a zig-zag position within the tire, and means connected with the cable outside of the tire to adjust the latter and regulate the tension of the springs, substantially as described.

2. A resilient tire comprising a hood, spiral springs radially arranged within the tire, their outer extremities acting on the inner surface of the tread of the tire, suspended seats which the inner extremities of the springs engage, a tension cable acting on the said seats, bosses extending outwardly beyond the inner extremities of the said seats and also engaged by the tension cable, means for regulating the tension of the latter, and levers mounted upon the bosses and acting upon the cable for braking purposes, said levers being operable from a position outside the tires, substantially as described.

3. A resilient tire comprising a hood, springs radially arranged within the hood, seats which the inner extremities of the springs engage, the said seats being equipped with anti-frictional devices, bosses extending into the hood intermediate the said springs and extending outwardly beyond the inner extremities of the seats, anti-frictional devices mounted on the outer extremities of the bosses, and cables engaging the bosses and the inner extremities of the seats within the hood, means with which the cables are connected for purposes of adjustment, a brake mounted upon each boss and acting upon the cables, and means for setting said brakes, said last named means being operable from a position outside the tire, substantially as described.

4. The combination of a wheel-rim, or felly, a hood applied to said felly, the felly being equipped with bosses extending into the hood, springs radially arranged within the hood and interposed between the bosses, the inner extremities of the springs being provided with seats equipped with anti-frictional devices, the last named devices extending inwardly beyond the outer extremities of the bosses, and a cable engaging the outer extremities of the bosses and the inner extremities of the spring seats, means mounted on the felly of the wheel with which the cable is connected for adjusting the latter whereby the tension of the springs is regulated, a brake mounted upon each boss and acting upon the cables and means for setting or releasing all of said brakes simultaneously, substantially as described.

5. A resilient tire comprising a rim, bosses extending beyond the rim and suitably separated, anti-frictional devices with which the bosses are equipped, leaf springs arranged transversely within the tire and engaging the walls of the latter, the inner extremities of the springs being arranged between the bosses, spiral springs radially arranged within the hood, and surrounded by the leaf springs, the outer extremities of the spiral springs engaging the leaf springs, seats suspended within the hood for the spiral springs and equipped with anti-frictional devices, a cable engaging the said seats and the said bosses causing it to occupy a zig-zag position within the hood, and a second cable engaging the leaf springs within the hood and also bearing upon the bosses, and means arranged outside of the hood with which the cables are connected for regulating the tension of the latter, substantially as described.

6. The combination of a wheel-rim, or felly, a hood applied to said felly, the felly being equipped with bosses extending into the hood, springs radially arranged within the hood and interposed between the bosses, the inner extremities of the springs being provided with seats equipped with bearings, said bearings extending inwardly beyond the outer extremities of the bosses, a cable engaging the outer extremities of the bosses and the bearings of the spring seats, levers fulcrumed on the bosses and engaging the said cable, a brake cable engaging the levers, and means mounted on the felly of the wheel and with which the cables are connected for adjusting the latter, substantially as described.

7. The combination of a wheel-felly, or rim, having separated projections extending radially beyond the rim and suitably separated, leaf springs arranged transversely within the hood, their inner portions occupying positions between the bosses of the felly and extending inwardly beyond the outer extremities of said bosses, a cable engaging the outer extremities of the bosses and the inner extremities of the springs for tensioning the latter, levers fulcrumed on the bosses and engaging the said cable, a brake cable engaging the levers, and means located outside the hood with which the cables are connected for tightening purposes, substantially as described.

8. A resilient tire comprising a rim, bosses extending beyond the rim and suitably separated, anti-frictional devices with which the bosses are equipped, leaf springs arranged transversely within the tire and engaging the walls of the latter, the inner extremities of the springs being arranged between the bosses, spiral springs radially arranged within the hood, seats suspended within the hood for the spiral springs, cables engaging the said seats and the said bosses, causing them to occupy a zig-zag position within the hood, a second cable engaging the leaf springs within the hood and also bearing upon the bosses, means mounted on the bosses and acting on the cables for braking purposes, said means being adjustable from a position beyond the hood, and means arranged outside the hood with which the cables are connected for regulating the tension of the latter. substantially as described.

9. In a resilient tire, springs bearing against one side of the inner wall of said tire, said springs being spaced from each other, supports extending into said tire in a diametrically opposite direction and between the springs, a tension cable bearing upon both the springs, and supports, and a lever mounted upon each of said supports and acting upon the tension cable to exert a braking influence.

10. In a resilient tire, springs bearing against one side of the inner wall of said tire, said springs being spaced apart, supports extending into said tire in a diametrically opposite direction and between the springs, a tension cable bearing upon both the springs and supports, a lever mounted upon each of said supports and adapted to exert a braking action upon the cable, and means for controlling said levers, said means being operable from a position outside the tire.

11. In a resilient tire, springs bearing against one side of the inner wall of said tire, said springs being spaced apart, supports extending into said tire in a diametrically opposite direction and between the springs, a tension cable bearing upon both the springs and supports, a lever mounted upon each of said supports and adapted to exert a braking action upon the cable and means for setting or releasing all of said brakes simultaneously, said means being operable from a position outside the tire.

In testimony whereof I affix my signature in presence of two witnesses.

HARRY J. SHERRILL.

Witnesses:
A. J. O'BRIEN,
MAY CLEMENTS.

---

Copies of this patent may be obtained for five cents each, by addressing the "Commissioner of Patents, Washington, D. C."